United States Patent [19]
Rice

[11] Patent Number: 6,042,057
[45] Date of Patent: Mar. 28, 2000

[54] AERODYNAMICALLY ACTUATED MAGNETIC ASCENT VENT COVER

[75] Inventor: Eric R. Rice, Seattle, Wash.

[73] Assignee: The Boeing Company, Seattle, Wash.

[21] Appl. No.: 09/045,056

[22] Filed: Mar. 19, 1998

[51] Int. Cl.$^7$ .................................................. B64G 1/00
[52] U.S. Cl. ...................................... 244/158 R; 244/1 R
[58] Field of Search .................................... 244/1 R, 121, 244/129.1, 129.5; 454/69, 76, 164, 904

[56] References Cited

U.S. PATENT DOCUMENTS

| | | |
|---|---|---|
| 2,981,172 | 4/1961 | Kalman . |
| 3,970,006 | 7/1976 | Copeland et al. . |
| 4,936,400 | 6/1990 | Blumbach et al. . |
| 5,062,345 | 11/1991 | Tegel et al. . |
| 5,114,098 | 5/1992 | Campbell . |
| 5,167,574 | 12/1992 | Ikeda et al. . |

*Primary Examiner*—Peter M. Poon
*Assistant Examiner*—Charles R Ducker, Jr.
*Attorney, Agent, or Firm*—Christensen O'Connor Johnson & Kindness PLLC

[57] ABSTRACT

An ascent vent cover (24) for covering and sealing vent holes (22) in a payload launch vehicle (21) is disclosed. The ascent vent cover (24) includes a magnetic sheet (32) for covering the vent hole (22) and attaching the ascent vent cover to the payload launch vehicle, a plurality of magnets (34a, 34b, 34c, . . . ) for augmenting the holding strength of the magnetic sheet, and a stiffening panel (38) for facilitating the peeling of the ascent vent cover away from the payload launch vehicle (21). The magnets (34a, 34b, 34c, . . . ) are secured to the magnetic sheet (32) so that some are positioned in a circular pattern so as to surround the underlying vent hole (22) and others are positioned along a leading edge of the magnetic sheet (32). The stiffening panel (38) includes a cover portion (39) and a tab portion (40) for securing to the magnetic sheet (32). The magnets (34a, 34b, 34c, . . . ) are embedded in the cover and tab portions. The tab portion (40) of the stiffening panel (38) is secured to a leading edge of the magnetic sheet (32) and functions primarily to facilitate the deployment of the ascent vent cover when sufficient dynamic pressure or air velocity is applied to the leading surface of the tab portion during the launch of the payload launch vehicle. Preferably, an RF shield (36) is located between the magnetic sheet (32) and the stiffening panel (38).

23 Claims, 5 Drawing Sheets

AERODYNAMICALLY ACTUATED MAGNETIC ASCENT VENT COVER

FIELD OF THE INVENTION

This invention relates to vent covers and, more particularly, to ascent vent covers for payload accommodations systems.

BACKGROUND OF THE INVENTION

Payload accommodations systems typically have vents on the exterior of a payload launch vehicle designed generally to vent gases from the interior to the atmosphere during ascent. Simultaneously, during launch, it is also important to keep contaminants and moisture out of the payload launch vehicle, to keep cooling air inside and flowing properly in the payload launch vehicle, and to maintain the interior acoustic environment of the payload launch vehicle.

The traditional approach has been to use flapper valves in combination with internal acoustic baffles to address all of these issues. The flapper valves are used for venting and contaminant protection, while the internal baffles control the internal acoustic load. This approach suffers from at least three main problems. First, installation of the flapper valves and internal baffles can be complicated and time consuming. Additionally, because flapper valves and internal baffles are permanently attached to the payload launch vehicle, they add unnecessary weight to the payload and thus increase launch vehicle power requirements. Finally, the use of interior baffles changes the flow characteristics within the payload cavity.

A second approach to this problem has been to use lanyard release mechanisms. In this method, plugs are used to cover the vent holes. These plugs are connected to one another by a rope. Upon launch, the rope is cut releasing the plugs and uncovering the vents. This approach also has problems. First, it can be quite complicated to implement. Second, it is not as reliable as desired.

A third method is to use a louvered, open hole. However, the disadvantage of this method is that contamination control is not guaranteed.

Therefore, there exists a need for an ascent vent cover that addresses the above venting issues, is simple, lightweight and reliable and saves operational time.

SUMMARY OF THE INVENTION

In accordance with this invention, an ascent vent cover for covering vent holes in a payload launch vehicle that is deployed by dynamic pressure during launch is provided. The ascent vent cover includes: a magnetic sheet for covering the vent hole and attaching the ascent vent cover to the payload launch vehicle; a plurality of magnets for augmenting the holding strength of the magnetic sheet; and a stiffening panel for facilitating the removal of the ascent vent cover by improving the peeling of the ascent vent cover away from the launch vehicle. The magnetic sheet has a leading edge from which the ascent vent cover is initially removed. The magnets are secured to the magnetic sheet such that some are positioned in a pattern that surrounds the perimeter of the underlying vent hole. Preferably, other magnets are positioned along the leading edge of the magnetic sheet. The stiffening panel is secured to the magnetic sheet and contains a plurality of recesses such that when the stiffening panel is secured to the magnetic sheet, the magnets are embedded and secured therein.

In accordance with further aspects of this invention, the magnetic sheet has the shape of a six-sided irregular polygon in which the leading edge is parallel to a shorter trailing edge.

In accordance with additional aspects of this invention, the stiffening panel further includes a cover portion for covering the underlying vent hole and a tab portion which is secured to the leading edge of the magnetic sheet.

In accordance with other aspects of this invention, the tab portion of the stiffening panel has an increased height compared to the cover portion of the stiffening panel and also forms an acute angle relative to the leading edge of the magnetic sheet.

In accordance with still further aspects of the invention, a preferred embodiment of the ascent vent cover also includes a radio frequency (RF) shield. The RF shield is secured to the magnetic sheet such that it covers the underlying vent hole. Preferably, the RF shield is secured to the magnetic sheet prior to securing the cover portion of the stiffening panel and contains circular holes for the magnets to fit through. Then, the cover portion of the stiffening panel is secured to the RF shield, again embedding and securing the magnets therein.

In accordance with yet further aspects of the invention, the stiffening panel has a plurality of wedge-shaped grooves positioned across an upper surface of the stiffening panel, not in contact with the RF shield or magnetic sheet. The wedgeshaped grooves also facilitate in the deployment of the ascent vent cover.

In accordance with yet other further aspects of the invention, the magnets are rare earth magnets, the stiffening panel is an expanded polystyrene stiffening panel, and the RF shield is an aluminum foil RF shield.

As will be readily appreciated from the foregoing description, the invention provides an ascent vent cover that after being magnetically attached to a payload launch vehicle is removable by aerodynamic forces produced during launch. The magnetic sheet and magnets function together to keep cooling air inside and properly flowing in the payload launch vehicle and to keep contaminants and moisture out of the payload launch vehicle during the initial stages of launch. By using an expanded polystyrene stiffening panel, acoustic loads that would otherwise enter through the vent holes are minimized and, thus, the internal acoustic environment is maintained. By using an RF shield, radio frequency waves inside the payload launch vehicle are prevented from interfering with signals being sent from an antenna outside the payload launch vehicle to a terminal. Furthermore, by creating a tab portion of the stiffening panel and by creating wedge-shaped grooves within the stiffening panel, the ascent vent cover can be deployed at a desired dynamic pressure or air velocity, thus permitting the vent hole to thereafter vent gases from the payload launch vehicle. Also, the ascent vent cover is simple, lightweight and inexpensive to create.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
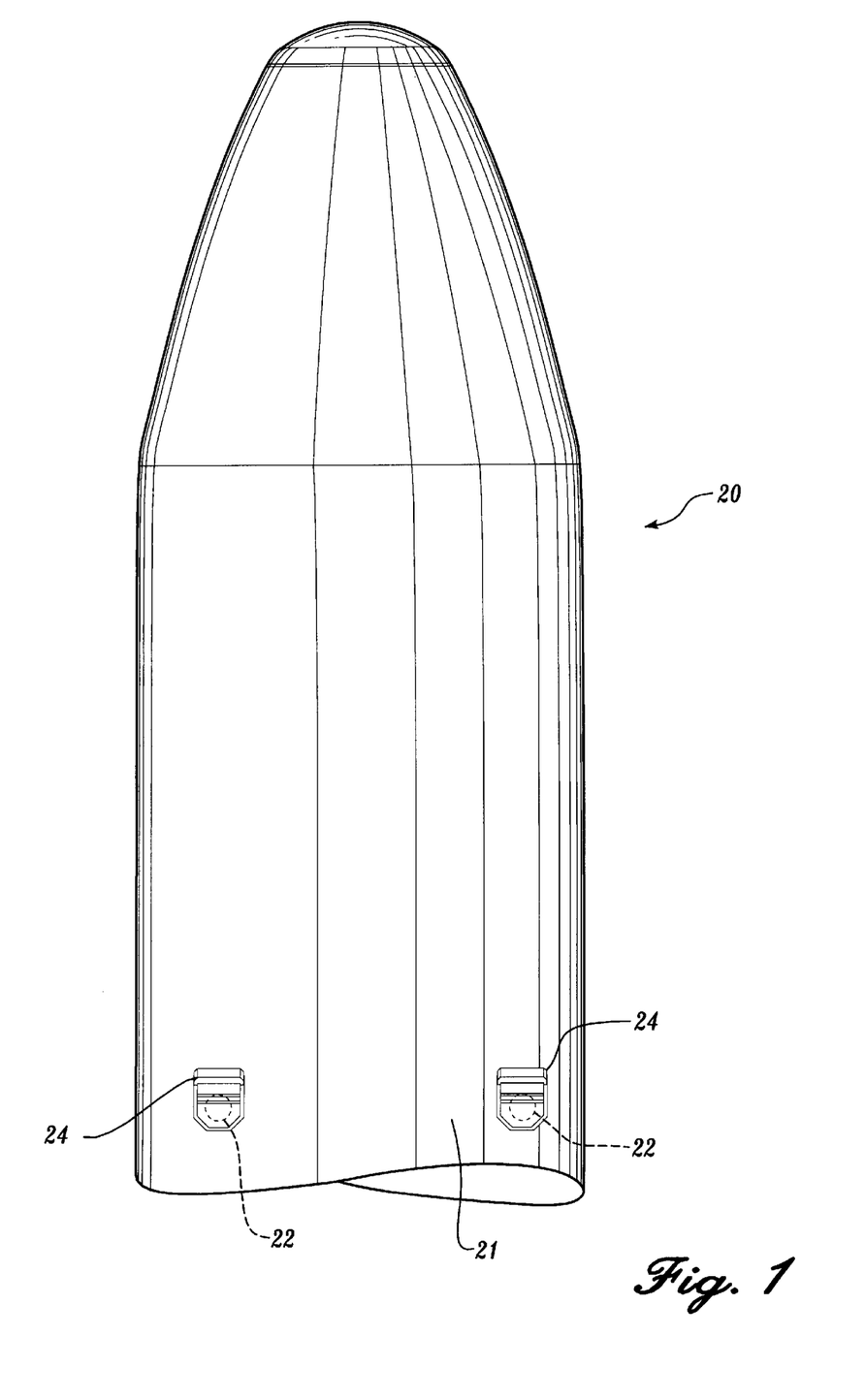
FIG. 1 is a pictorial view of a payload launch vehicle depicting vent holes covered by ascent vent covers formed in accordance with this invention.

The present invention is an ascent vent cover that is aerodynamically peeled off of a vent hole in a payload fairing at the appropriate time during ascent of a payload launch vehicle. FIG. 1 illustrates a payload launch vehicle 20 having a payload fairing 21 that contains vent holes 22. The vent holes 22 are sealed by ascent vent covers 24 formed in accordance with this invention. While shown as circular, the vent holes could have other shapes. Furthermore, while shown as an irregular polygon, the vent cover could also have other shapes.

Figure 2:
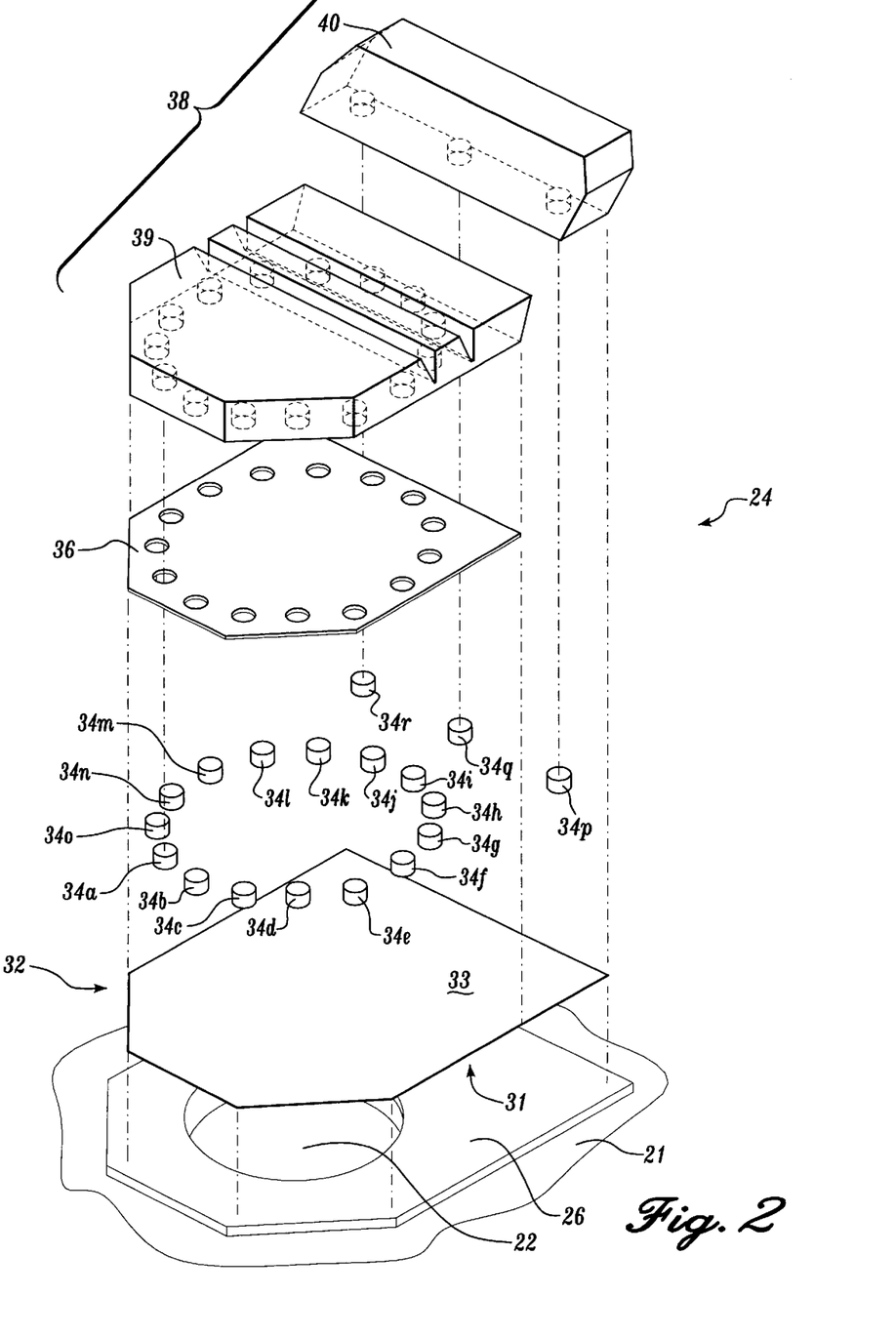
FIG. 2 is an exploded view of an ascent vent cover formed in accordance with this invention as applied to a surface surrounding a vent hole.

As shown in an exploded view in FIG. 2, the ascent vent covers 24 each include a magnetic sheet 32, a plurality of cylindrical permanent magnets 34a, 34b, 34c, . . . , a radio frequency (RF) shield 36, and a stiffening panel 38. The stiffening panel 38 further includes a cover portion 39 for covering the underlying vent hole 22 and a tab portion 40 that assists in peeling the ascent vent cover 24 off the vent hole 22 at the desired dynamic pressure or air velocity.

The magnetic sheet 32 has an inner surface 31 that attaches the ascent vent cover 24 to a vent plate 26 that surrounds the vent hole 22 in the payload fairing 21. The magnets 34a, 34b, 34c, . . . are secured to the outer surface 33 of the magnetic sheet 32 by any suitable attachment mechanism, such as adhesive. The RF shield 36 is secured to the outer surface 33 of the magnetic sheet 31 and has a plurality of circular holes through which the magnets 34a, 34b, 34c, . . . pass, as shown in FIG. 2. The stiffening panel 38 is secured to the outer surface of the RF shield 36 and magnetic sheet 32 such that the cover portion 39 is positioned over the RF shield and the tab portion is positioned over the magnetic sheet 32. Both the cover and top portions include holes sized and positioned to receive the magnets 34a, 34b, 34c . . .

The magnet sheet 32 is formed of a flexible magnetic material such as a flexible plastic magnetic sheet. The RF shield 36 is formed of a suitable RF shielding material, such as aluminum foil. The stiffening panel is formed of a relatively thick suitably rigid, non-metallic material, such as expanded polystyrene. The magnetic sheet 32, the RF shield 36 and the stiffening panel 38 are secured to one another by any suitable attachment mechanism, such as adhesive.

Figure 3:
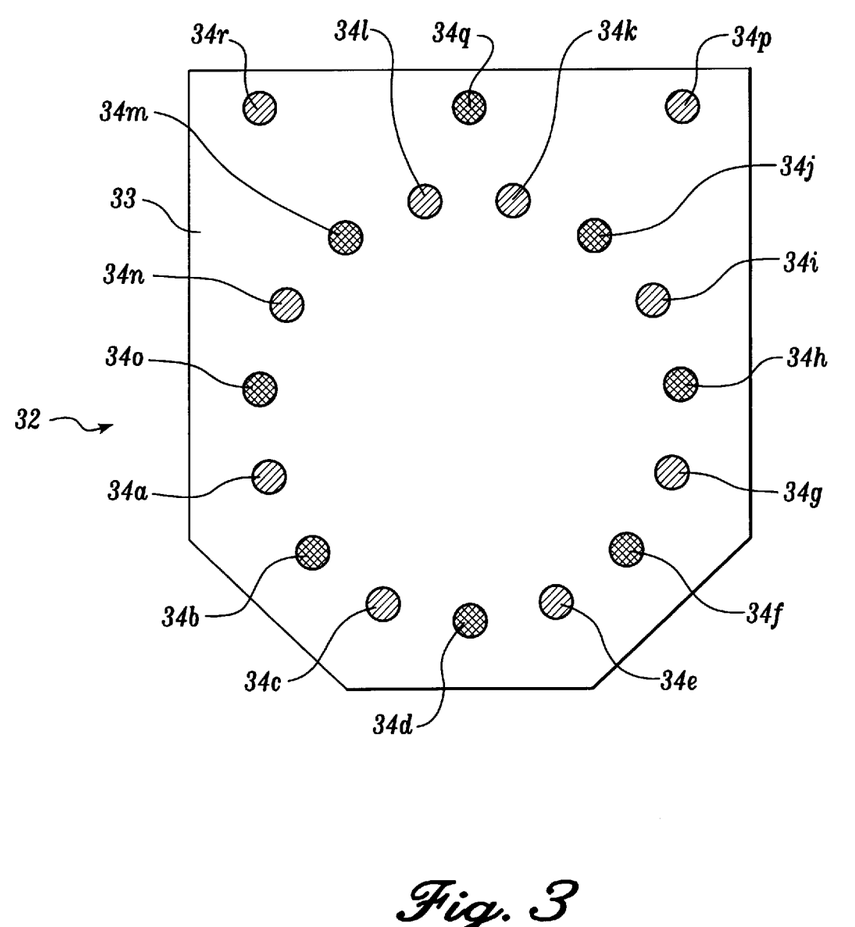
FIG. 3 is a portion of an ascent vent cover of the present invention depicting the placement and orientation of magnets on a magnetic sheet.

FIG. 3 illustrates the magnetic sheet 32 assembled with the magnets 34a, 34b, 34c . . . in the plan view. The magnetic sheet 32 is shaped in the form of a sixsided irregular polygon having a leading edge and a shorter trailing edge as shown in FIG. 3. During launch, when the magnetic sheet adheres to the vent plate 26 on the payload fairing 21, the magnetic sheet keeps cooling air inside the payload fairing, while also keeping contaminants and moisture out of the payload fairing. The preferred magnetic sheet is both thin and flexible. In one actual embodiment of the invention, the magnet sheet is a Bunting NA 1695 magnetic sheet.

In order to improve the holding force of the magnetic sheet, magnets 34a, 34b, 34c . . . are secured to the magnetic sheet. As shown in FIG. 3, some of the magnets are positioned on the magnetic sheet 32 in a circular pattern. The circular pattern is chosen so that when the ascent vent cover is later applied to the vent plate 26 on the payload fairing 21, the magnets will lie along the perimeter of the underlying vent hole 22. The magnets located in the circular pattern help to more completely seal the vent hole so that any potential air gaps or leak areas surrounding the vent hole are minimized. The remaining magnets are placed along the leading edge of the magnetic sheet 32, as shown in FIG. 3. Because of their holding power efficiency, the preferred magnets are rare earth magnets. In one actual embodiment of the invention, the chosen magnets are Bunting NEP 3050 NP rare earth magnets. In this embodiment of the invention, fifteen magnets are in the circular pattern and three are located along the leading edge of the magnetic sheet 32.

The magnets in both the circular pattern and along the leading edge are placed equidistantly from one another. Furthermore, the North/South Pole magnetic orientation of the magnets is alternated. As a result, adjacent magnets have opposite magnetic orientations. This orientation is best shown in FIG. 3 where the cross-hatched magnets represent magnets with a North Pole magnetic orientation directed toward the magnetic sheet and the striped magnets represent magnets with a South Pole magnetic orientation directed toward the magnetic sheet. In an alternative embodiment of the invention, the cross-hatched magnets represent magnets having a South Pole magnetic orientation directed toward the magnetic sheet and the striped magnets represent magnets having a North Pole magnetic orientation directed toward the magnetic sheet. Effectively, the pattern of the magnets creates a magnetic circuit and the orientation optimizes the holding force of the magnetic circuit.

As shown in FIG. 2 and noted above, the RF shield 36 is secured to the magnetic sheet 32 and contains circular holes for the magnets to fit through. As a result, the entire RF shield is juxtaposed against the magnetic sheet. The RF shield 36 keeps RF waves emitted by satellite antennas located in the interior of the payload fairing 21 from interfering with signals sent from antennas located on the exterior of the payload fairing 21 to a ship or ground terminal, for example. Preferably, the RF shield does not fully extend over the entire outer surface 33 of the magnetic sheet 32. Rather, the RF shield 36 has the same general shape as the magnetic sheet and, at a minimum, covers the outer surface 33 of the magnetic sheet 32 lying directly above the underlying vent hole 22. Alternatively, if desired, the RF shield could cover the entire magnetic sheet 32 and even the magnets 34a, 34b, 34c . . . Further, if desired, the RF shield 36 could be disposed on top of the stiffening panel. In this regard, although the preferred RF shield is an aluminum foil shielding sheet, the RF shield 36 could also be created by painting any surface of the ascent vent cover with a metallic paint so that the paint shields the underlying vent hole. The paintable surfaces include the outer and inner surface of both the magnetic sheet 32 and the stiffening panel 38.

Figures 4, 5:
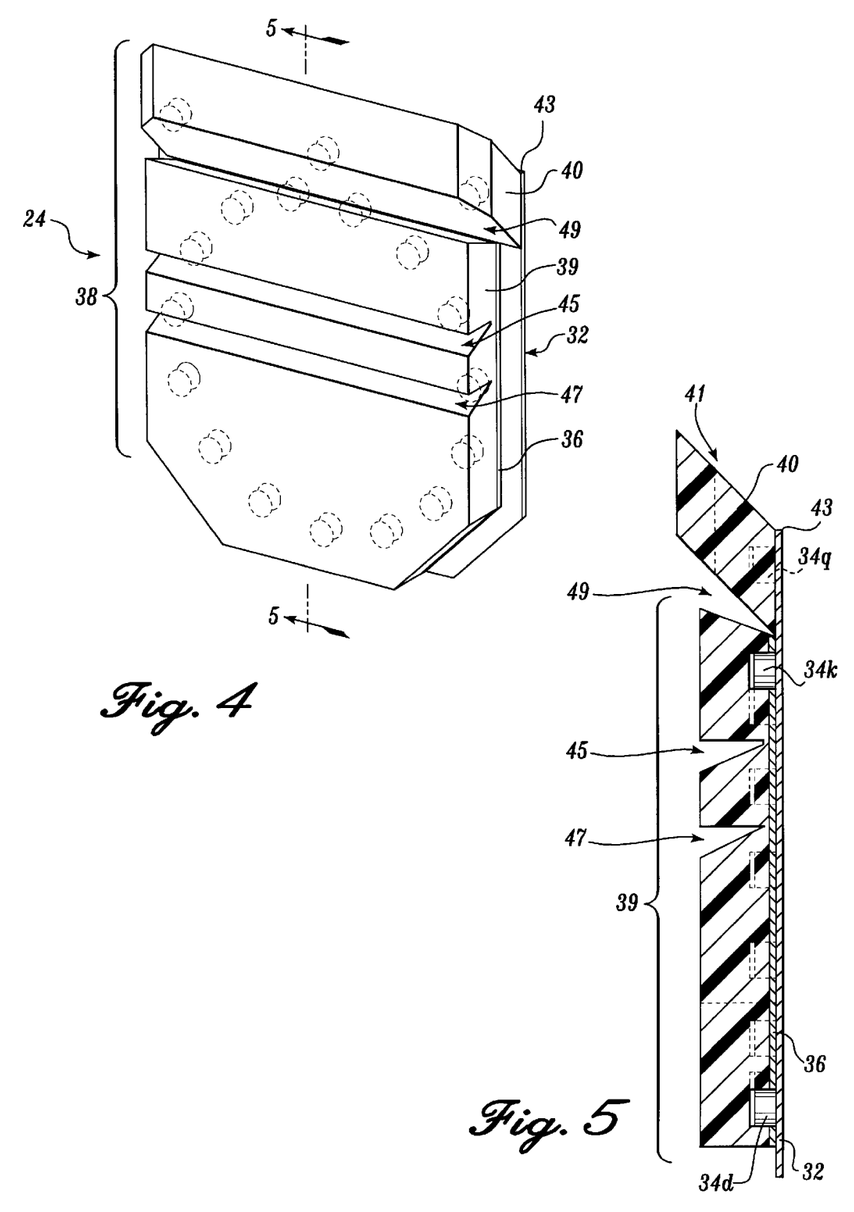
FIG. 4 is a front view of an ascent vent cover of the present invention.
FIG. 5 is cross-sectional view of an ascent vent cover of the present invention taken along line 5—5 of FIG. 4.

FIG. 4 is a front view of the fully assembled ascent vent cover 24, and FIG. 5 a cross-sectional view. As shown in FIG. 4, the cover portion 39 of the stiffening panel 38 has the same shape as the RF shield 36. The cover portion 39 is secured to the RF shield and embeds and secures the magnets located in the circular pattern on the underlying magnetic sheet 32. The tab portion 40 of the magnetic sheet 32 is elongate and has a parallelogram cross-section. As shown in FIG. 4, the tab portion 40 is secured to the leading edge 43 of the magnetic sheet 32 and extends from one side of the magnetic sheet across to the other side. As shown best in FIG. 5, the RF shield 36 does not extend to the leading edge of the magnetic sheet 32. Furthermore, the tab portion 40 is positioned adjacent to the cover portion 39 of the stiffening panel 38 and embeds and secures the magnets 34p, 34q and 34r secured along the leading edge of the magnetic sheet 30. Embedding and securing the magnets in the stiffening panel 38 results in the magnets staying in their proper positions. As best shown in FIG. 5, the leading surface 41 of the tab portion 40 extends outwardly from the leading edge of the magnetic sheet, i.e., the leading surface 41 of the tab portion 40 overhangs the leading edge 43 of the magnetic sheet 32.

As best shown in FIG. 5, the cover portion 39 of the stiffening panel 38 has two wedge-shaped grooves 45 and 47 extending from one side of the cover portion to another, parallel to the tab portion 40. The side of the wedge-shaped grooves nearest to the leading edge 43 of the magnetic sheet 32 lies normal to the magnetic sheet and the other side of the wedge-shaped grooves forms an acute angle with the magnet sheet, also as shown in FIG. 5. Viewed from the side (FIG. 5), the two wedge-shaped grooves appear to divide the cover portion 39 of the stiffening panel 38 into three trapezoidal-shaped regions. Furthermore, although adjacent to the cover portion 39 of the stiffening panel 38, the parallelogram shape of the tab portion 40 results in a wedge-shaped groove 49 being formed between the cover and tab portions. As will be better understood from the following description, the wedge-shaped grooves 45, 47 and 49 improve the ability of the ascent vent cover to peel away from the payload fairing by aerodynamic force.

As noted above, the preferred stiffening panel 38 material is expanded polystyrene, which is light in weight while being suitably rigid. Furthermore, an expanded polystyrene stiffening panel has the acoustic and thermal qualities required by a payload launch vehicle.

The ascent vent cover is configured to be removed by aerodynamic forces during the launch of a payload launch vehicle. The configuration of the tab portion 40 of the stiffening panel facilitates removal. More specifically, the configuration of the tab portion helps the ascent vent cover to peel away from the payload fairing at a predetermined dynamic pressure or air velocity. In this regard, the preferred range for complete removal of the ascent vent cover is approximately 32–36 psf (pounds per square foot), the preferred thickness of the tab portion of the stiffening panel with respect to the outer face of the magnetic sheet 32 is approximately 1.25 to 1.5 inches. The cover portion of the stiffening sheet need not be of the same height, and in the preferred embodiment is 1 inch thick. As noted above, the leading surface of the tab portion of the stiffening panel forms an acute angle relative to the leading edge of the underlying magnetic sheet. The preferred angle is 45 degrees. Obviously, for different deployment commitment ranges, the thickness of the tab portion and the angle of the leading surface of the tab portion relative to the leading edge of the underlying magnetic sheet can vary. For example, the tab portion could alternatively be equal in thickness to the cover portion or possibly even less. Furthermore, the angle of the leading surface of the tab portion could even be 90° for a significantly higher deployment range.

Figures 6, 7:
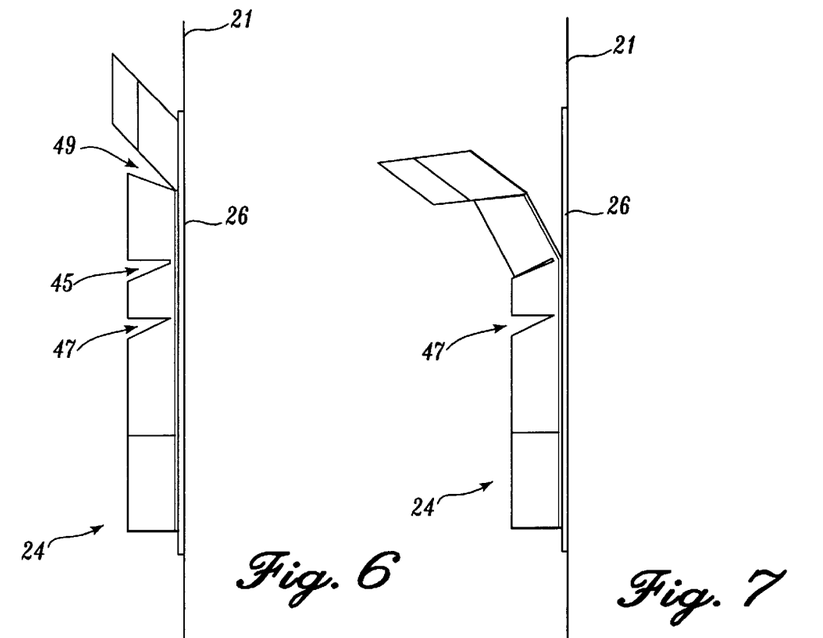
FIG. 6 is a side view of an ascent vent cover of the present invention shown attached to an outer surface surrounding a vent hole on a payload fairing.
FIG. 7 is a side view of an ascent vent cover of the present invention depicting how the ascent vent cover is initially peeled from the payload fairing during ascent.
Figure 8:
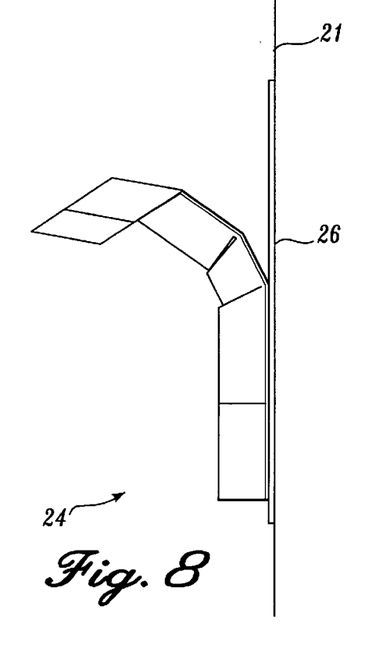
FIG. 8 is a side view of an ascent vent cover of the present invention depicting how the ascent vent cover is partially peeled from the payload fairing during ascent.
Figure 9:
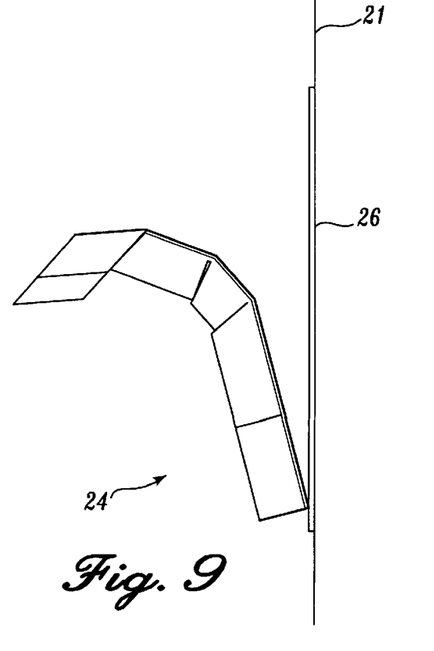
FIG. 9 is a side view of an ascent vent cover of the present invention depicting how the ascent vent cover is finally peeled from the payload fairing during ascent.

FIG. 6 illustrates the fully assembled ascent vent cover 24 magnetically engaged with the vent plate 26 on the exterior surface of the payload fairing 21, and FIG. 7 illustrates the ascent vent cover 24 as it is initially forced off of the vent plate 26. As shown in FIG. 7, the ascent vent cover peels away from the vent plate when sufficient dynamic pressure is applied to the leading surface of the tab portion 40. As this occurs, the magnetic sheet 32 bends and the rear surface of the tab portion of the stiffening panel comes into contact with the leading surface of the cover portion thereby closing the wedge-shaped groove 49 between them. Continued dynamic pressure causes the magnetic sheet (and the RF shield) to bend and peeling to continue, resulting in one of wedge-shaped grooves 45 of the cover portion closing. FIG. 8 illustrates that further bending of the magnetic sheet 32 caused by continued dynamic pressure results in the other wedge-shaped groove 47 closing. As each wedge-shaped groove is closed and as the ascent vent cover peels away from the vent plate 26, the distance between the tab portion of the stiffening panel and the vent plate is increased. The portion of the ascent vent cover that has been removed functions, together with the tab portion of the stiffening panel, to create a new heightened tab portion as shown in FIGS. 7 and 8. This heightened tab portion facilitates the complete removal of the ascent vent cover from the vent plate as shown in FIG. 9.

As will be readily appreciated by those skilled in the art and others, a magnetic ascent vent cover formed in accordance with this invention has a number of advantages. First, the vent cover maximizes vent efficiency. Not only does the vent cover allow gases to vent from the fairing interior to the atmosphere during ascent after reaching a particular ascent level, the vent cover keeps cooling air inside and properly flowing in the payload launch vehicle and contaminants and moisture out of the payload launch vehicle. The vent cover minimizes the acoustic loads that enter through the vent holes, thereby maintaining the internal acoustic environment during the beginning of the launch. Second, the vent cover is simple, reliable, lightweight and inexpensive. Finally, from an operational standpoint, the vent cover installation procedure is simple and can be performed at nearly any point prior to launch.

While the preferred embodiment of the invention has been illustrated and described, it should be understood that various changes can be made therein. For example, the cover and tab portions of the stiffening panel can be physically separate units or a single unit. The cover portion of the stiffening panel can also have a varying number of wedge-shaped grooves. Further, the grooves can be of varying shapes. Also, the magnets may be positioned in a variety of patterns, depending upon vent hole shape. Even further, the general shape of the magnetic sheet, the RF shield, and the stiffening panel may be altered. In this regard, the ascent vent cover could generally be circular in nature with the tab portion surrounding the entire perimeter of the ascent vent cover such that air coming from any direction would initiate the peeling process. This configuration creates an ascent vent cover that would be deployable regardless of the orientation at which it was installed. Thus, within the scope of the appended claims it is to be understood that the invention can be practiced otherwise than as specifically described herein.

What is claimed is:

1. An ascent vent cover for covering a vent hole on a payload launch vehicle, comprising:
   a flexible sheet for covering a launch vehicle vent hole, the sheet having an inner surface juxtaposed against the payload launch vehicle and an, outer surface opposite the inner surface;
   a plurality of magnets disposed on the outer surface of the flexible sheet; and
   a stiffening panel secured to the outer surface of the flexible sheet, the stiffening panel including a plurality of recesses in which the plurality of magnets are disposed.

2. The ascent vent cover of claim 1, wherein the flexible sheet is a flexible magnetic sheet.

3. The ascent vent cover of claim 2, wherein the stiffening panel includes a cover portion and a tab portion, said tab portion designed to assist peeling the ascent vent cover away from a payload launch vehicle during launch when a predetermined amount of dynamic pressure is applied to said tab portion.

4. The ascent vent cover of claim 3, further comprising a radio frequency shield disposed on top of the stiffening panel.

5. The ascent vent cover of claim 3, further comprising a radio frequency shield disposed between the stiffening panel and the payload launch vehicle.

6. The ascent vent cover of claim 5, wherein the radio frequency shield is disposed between the outer surface of the flexible magnetic sheet and the stiffening panel.

7. The ascent vent cover of claim 6, wherein the radio frequency shield is an aluminum foil radio frequency shielding sheet.

8. The ascent vent cover of claim 3, wherein said tab portion has a leading surface and said magnetic sheet has a leading edge and wherein the leading surface of said tab portion forms an acute angle at the leading edge of said magnetic sheet relative to the outer surface of said magnetic sheet.

9. The ascent vent cover of claim 8, wherein said acute angle is 45 degrees.

10. The ascent vent cover of claim 8, wherein said tab portion of said stiffening panel is approximately 1.25 to 1.5 inches thick.

11. The ascent vent cover of claim 8, wherein said tab portion of said stiffening panel has the cross-sectional shape of a parallelogram.

12. The ascent vent cover of claim 3, wherein said cover portion of said stiffening panel includes a plurality of grooves that span said cover portion.

13. The ascent vent cover of claim 12, wherein said plurality of grooves are wedge-shaped and wherein one side of said wedge-shaped grooves fits normal to the outer surface of said magnetic sheet and the other side of said wedge-shaped grooves forms an acute angle with the outer surface of said one side.

14. The ascent vent cover of claim 3, wherein said cover portion and said tab portion of said stiffening panel are independently secured to said magnetic sheet and said plurality of magnets are embedded in said cover and tab portions of said stiffening panel.

15. The ascent vent cover of claim 2, wherein said magnetic sheet is shaped as an irregular polygon having a parallel leading and trailing edge wherein the trailing edge is shorter than the leading edge.

16. The ascent vent cover of claim 3, wherein some of said magnets are secured to said magnetic sheet in a circular pattern.

17. The ascent vent cover of claim 16, wherein said magnets secured to said magnetic sheet in a circular pattern are positioned equidistantly from one another.

18. The ascent vent cover of claim 17, wherein said magnets have a north and south pole magnetic orientation and wherein the north and south pole magnetic orientations of adjacent magnets are in opposite directions.

19. The ascent vent cover of claim 16, wherein other of said magnets are secured along a leading edge of said magnetic sheet.

20. The ascent vent cover of claim 19, wherein said magnets secured along a leading edge of said magnetic sheet are positioned equidistantly from one another.

21. The ascent vent cover of claim 20, wherein said magnets have a north and south pole magnetic orientation and wherein the north and south pole magnetic orientations of adjacent magnets are in opposite directions.

22. The ascent vent cover of claim 2, wherein said magnets are rare earth magnets.

23. The ascent vent cover of claim 2, wherein said stiffening panel is an expanded polystyrene stiffening panel.

* * * * *

UNITED STATES PATENT AND TRADEMARK OFFICE
CERTIFICATE OF CORRECTION

PATENT NO. : 6,042,057
DATED : March 28, 2000
INVENTOR(S) : E.R. Rice

It is certified that error appears in the above-identified patent and that said Letters Patent is hereby corrected as shown below:

COLUMN    LINE

7        6      after "an" delete ","
(Claim 1, line 5)

8       21     "claim 3" should read --claim 2--
(Claim 16, line 1)

Signed and Sealed this

Tenth Day of April, 2001

Attest:

NICHOLAS P. GODICI

Attesting Officer     *Acting Director of the United States Patent and Trademark Office*